US011769113B2

(12) United States Patent
Aldrich et al.

(10) Patent No.: US 11,769,113 B2
(45) Date of Patent: *Sep. 26, 2023

(54) SOCIAL NETWORK SITE INCLUDING MODIFICATION CONTROL AND MANAGEMENT

(71) Applicant: Slack Technologies, LLC, San Francisco, CA (US)

(72) Inventors: William Clement Aldrich, San Francisco, CA (US); Ryo Chijiiwa, Cerritos, CA (US); Vu Hao Thi Truong, Mountain View, CA (US); Michael Speiser, Menlo Park, CA (US)

(73) Assignee: Slack Technologies, LLC, San Francisco, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/751,242

(22) Filed: May 23, 2022

(65) Prior Publication Data

US 2022/0284397 A1 Sep. 8, 2022

Related U.S. Application Data

(63) Continuation of application No. 17/229,417, filed on Apr. 13, 2021, now Pat. No. 11,373,144, which is a
(Continued)

(51) Int. Cl.
*G06Q 10/10* (2023.01)
*G06F 16/958* (2019.01)
(Continued)

(52) U.S. Cl.
CPC ........... *G06Q 10/10* (2013.01); *G06F 16/958* (2019.01); *G06F 16/986* (2019.01);
(Continued)

(58) Field of Classification Search
CPC ........ G06F 16/48; G06F 16/316; G06F 16/41; G06F 16/58; G06F 16/951
(Continued)

(56) References Cited

U.S. PATENT DOCUMENTS 7,756,895 B1* 7/2010 Emigh ................... H04N 21/47
707/756
2007/0186007 A1* 8/2007 Field ..................... H04L 67/306
709/233
(Continued)

OTHER PUBLICATIONS

"Die, Email, Die! A Flickr Cofounder Aims To Cut US All Some Slack", Readwriteweb, LexisNexis, https://advance.lexis.com/api/permalink/33dd79e2-90f5-409d-ae27-5a2c7e86bf31/?context=1000516>. (dated Aug. 14, 2013) 2 pages.
(Continued)

*Primary Examiner* — Hung T Vy
(74) *Attorney, Agent, or Firm* — Erise IP, P.A.

(57) ABSTRACT

Disclosed is a social networking system which provides personal pages for users and enables other users to modify the personal page of a given user. Generally, a given webpage is enabled to be collaboratively modified and edited by multiple users. In some embodiments, the owner of the personal page approves the trusted users and may define one or more rules that automatically define a trusted user. In some embodiments, rules for modifying/editing a social webpage may specify the type of operations users can perform on the page and may specify one or more potential target actions.

20 Claims, 16 Drawing Sheets

Related U.S. Application Data continuation of application No. 13/108,473, filed on May 16, 2011, now Pat. No. 11,120,400, which is a continuation of application No. 11/853,768, filed on Sep. 11, 2007, now Pat. No. 7,945,862.

(51) Int. Cl.
| | |
|---|---|
| *G06Q 50/00* | (2012.01) |
| *G06F 40/197* | (2020.01) |
| *G06F 40/103* | (2020.01) |
| *G06F 21/62* | (2013.01) |
| *H04L 51/043* | (2022.01) |
| *H04L 9/40* | (2022.01) |

(52) U.S. Cl.
CPC ........ *G06F 21/6218* (2013.01); *G06F 40/103* (2020.01); *G06F 40/197* (2020.01); *G06Q 50/01* (2013.01); *H04L 51/043* (2013.01); *H04L 63/0807* (2013.01)

(58) Field of Classification Search
USPC .......................................... 707/785; 709/233
See application file for complete search history.

(56) References Cited

U.S. PATENT DOCUMENTS

| | | | | |
|---|---|---|---|---|
| 2007/0250901 | A1* | 10/2007 | McIntire | G11B 27/34 348/E7.071 |
| 2018/0287982 | A1 | 10/2018 | Draeger et al. | |

OTHER PUBLICATIONS

"How Slack changed the way we work by putting the customer experience first", Repeat Customer Podcast, Episode 3, [online][retrieved May 9, 2019]. Retrieved from the Internet: <URL: https://www.zendesk.com/resources/slack-customer-experience/, (2019) 13 pages.

Adrienne LaFrance, "The Triumph of Email", Atlantic Online, LexisNexis, https://advance.lexis.com/api/permalink/32d7ddd9-d4c1-4a73-86f7-08ab5842fde6/?context=1000516, (dated Jan. 6, 2016) 5 pages.

David Auberbach, "Re-Animator. How Stewart Butterfield created Flickr and Slack out of the ashes of failed projects" [online][retrieved May 9, 2019]. Retrieved from the Internet: <URL: https://slate.com/business/2014/05/stewart-butterfield-flickr-and-slack-how-he-snatched-victory-from-the-jaws-of-defeat.html>. (dated May 28, 2014) 8 pages.

Ernie Smith, "Picking Up The Slack", TEDIUM, [online][retrieved May 9, 2019]. Retrieved from the Internet: <URL: https://tedium.co/2017/10/17/irc-vs-slack-chat-history/> (dated Oct. 17, 2017) 13 pages.

Internet Relay Chat, WIKIPEDIA, [online][retrieved May 30, 2019]. Retrieved from the Internet: <URL: https://en.wikipedia.org/wiki/Internet_Relay_Chat>. (dated May 28, 2019) 20 pages.

Jonathan Vanian, "Why these startups think chat apps are the next big thing in workplace collaboration", GIGAOM, LexisNexis, https://advance.lexis.com/api/permalink/e83778c8-09c8-43aa-9ba0-88526283de69/?context=1000516, (dated Aug. 1, 2014) 4 pages.

Matsumoto, T. et al., "Chocoa Communicator—A New Communication System Based on Awareness and Text Communications-", FUJITSU Sci. Tech. J., 36, 2, (Dec. 2000) 154-161.

Matthew Ingram, "Flickr co-founder launches Slack, an all-in-one messaging tool designed to kill email forever", GIGAOM, LexisNexis, https://advance.lexis.com/api/permalink/0b676b7c-aec3-4560-861e-d030d1dd008c/?context=1000516, (dated Feb. 12, 2014), 2 pages.

Michael Carney, "Slack is thriving on a cocktail of whimsy and great timing", Pandodaily, LexisNexis, https://advance.lexis.com/api/permalink/dd2d4ee5-2ddf-4d3a-a1d9-3bcee5e38b74/?context=1000516, (dated Feb. 6, 2015, 2:12 AM) 3 pages.

Mike Issac, "Slack, a Start-Up With an App to Foster Business Collaboration, Is Valued at $1.1 Billion", The New York Times Blogs (BITS), LexisNexis, https://advance.lexis.com/api/permalink/3eb84b34-a8f9-4d7d-9573-89d9598a4963/?context=1000516> (dated Oct. 31, 2014) 2 pages.

Oikarinen, J. & Reed, D., "Internet Relay Chat Protocol", Request for Comments: 1459, Network Working Group, [online][retrieved May 30, 2019]. Retrieved from the Internet: <URL: https://www.rfc-editor.org/rfc/rfc1459.txt>. (dated May 1993) 57 pages.

Rebecca Walberg, "Email biggest office waste of time: survey", National Post, At FP10, LexisNexis, https://advance.lexis.com/api/permalink/96268e3f-26ad-48ac-a98f-6c39804ebded/?context=1000516, (dated Mar. 4, 2014) 2 pages.

Robert Hof, "Stewart Butterfield On How Slack Became A $2.8 Billion Unicorn", FORBES, [online][retrieved May 9, 2019]. Retrieved from the Internet: <URL: https://www.forbes.com/sites/roberthof/2015/06/02/stewart-butterfield-on-how-slack-became-a-2-8-billion-unicorn-2/#7c31937d7d9c>. (dated Jun. 2, 2015), 3 pages.

The Big Pivot w/ Slack's Stewart Butterfield, Masters of Scale Podcast, Episode 13 (Aired Nov. 14, 2017), https://mastersofscale.com/#/stewart-butterfield-the-big-pivot/, (dated Jan. 17, 2018) 27 pages.

What is Active Status and how does it work? | Facebook Help Center; https://www.facebook.com/help/448141485230424/; Retrieved Apr. 5, 2021.

\* cited by examiner

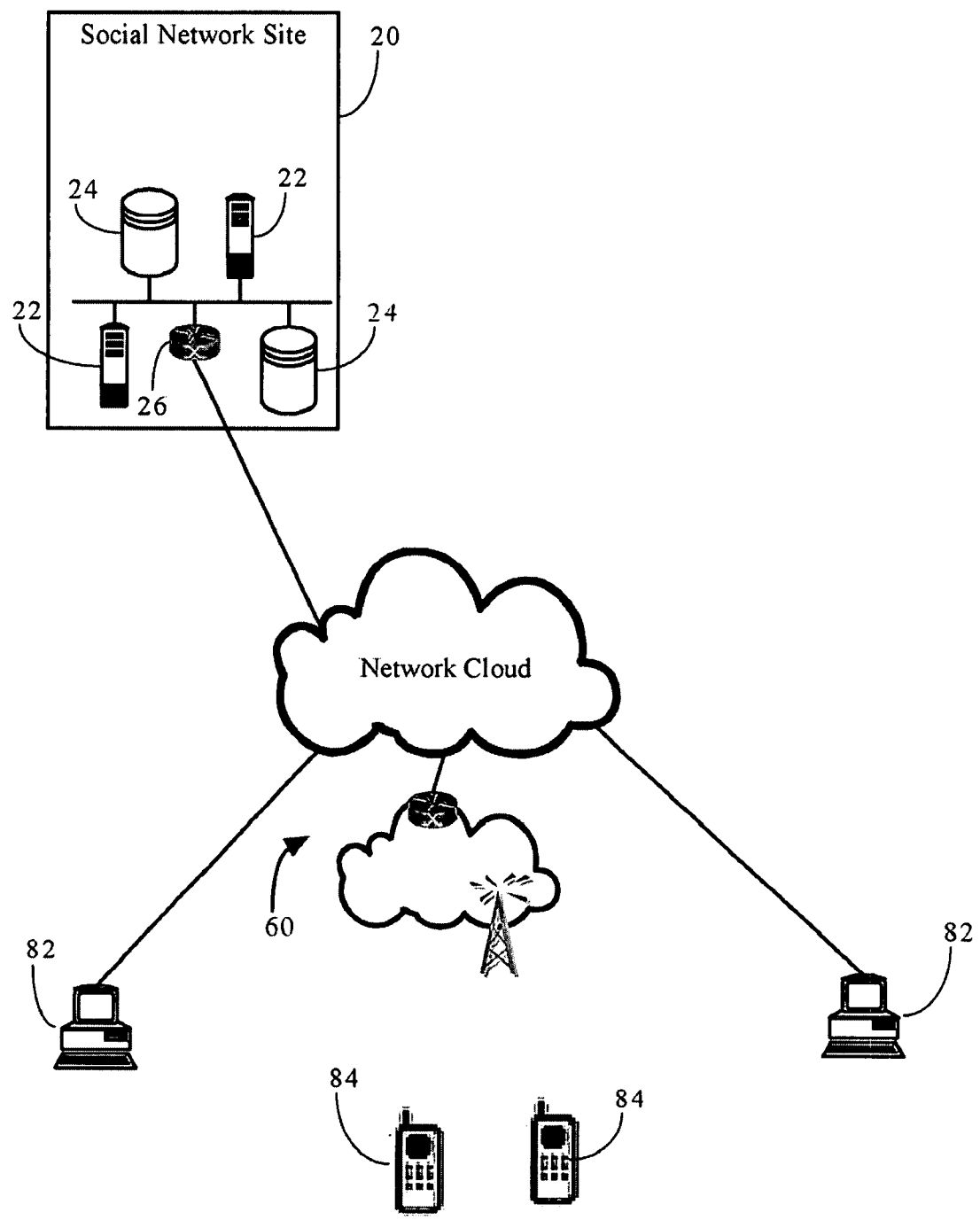
Fig._1

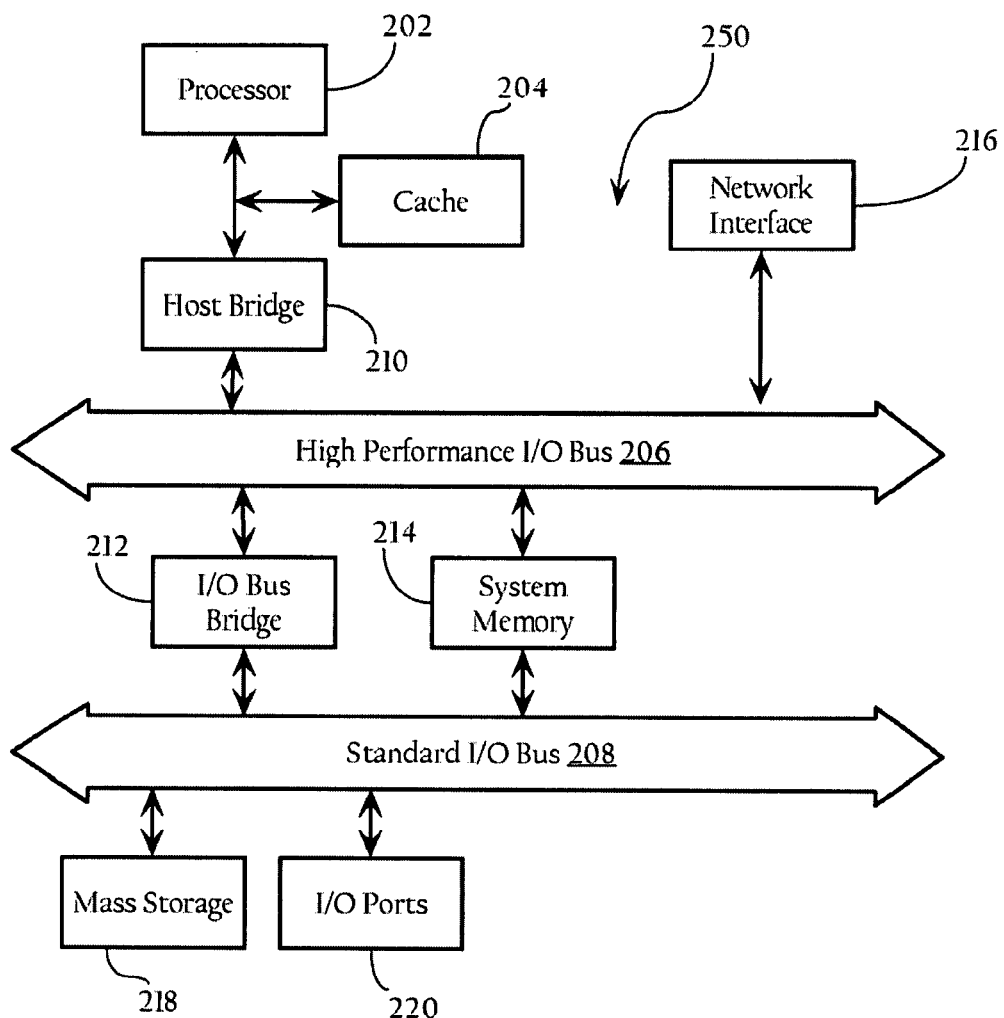
Fig._2

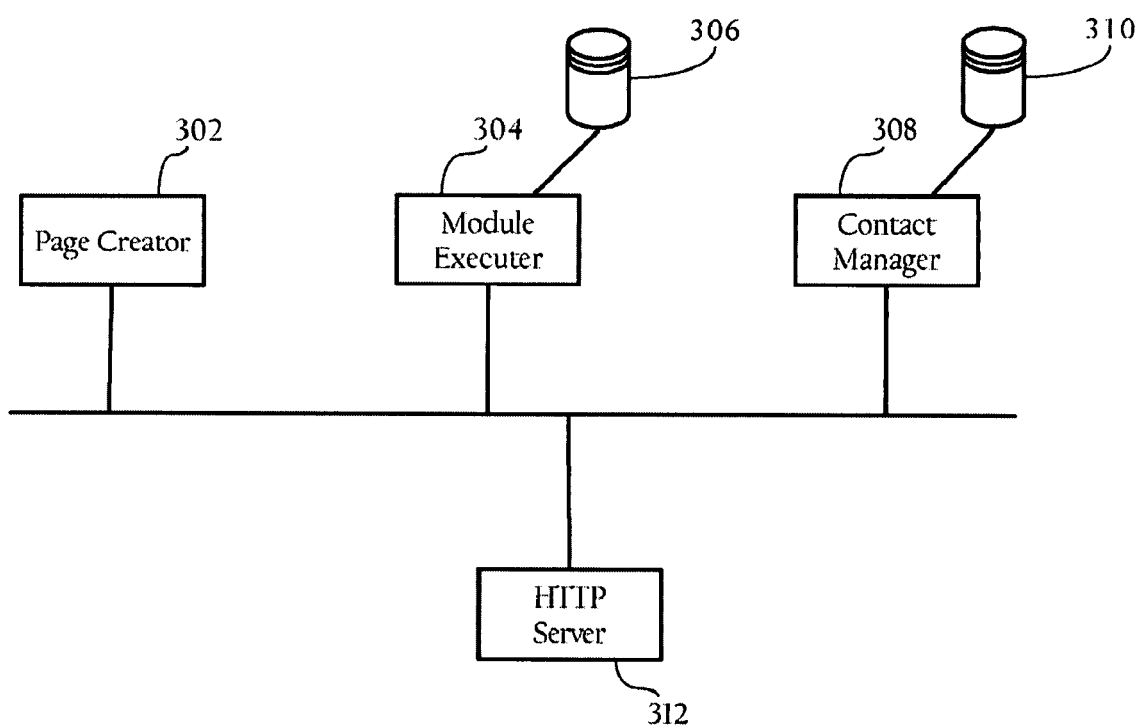
Fig._3

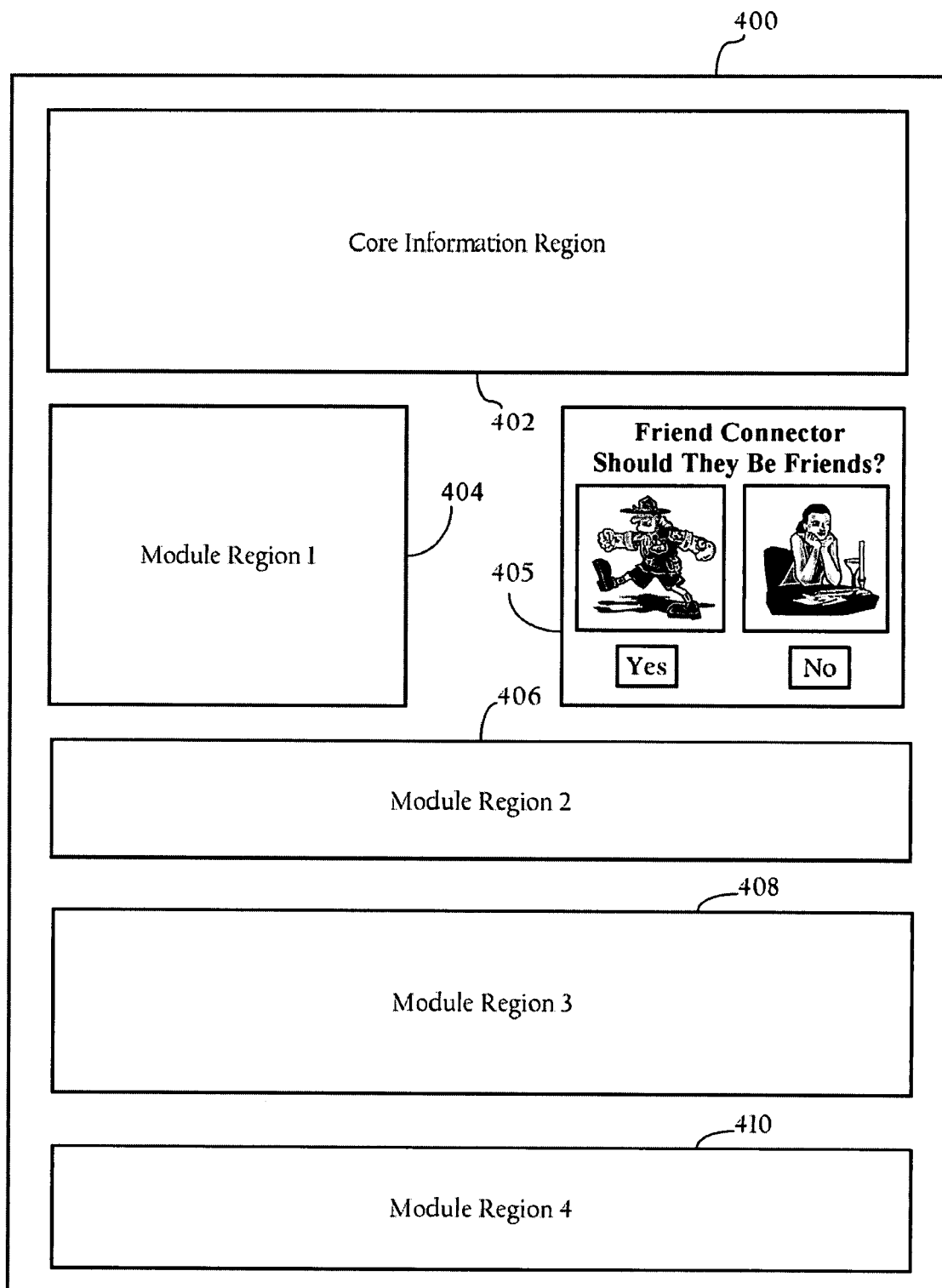
Fig._4

Data Table

| Owner | Editor | Key | Value | Time Stamp | Status | Difference |
|---|---|---|---|---|---|---|
| S | R | Candy | Candy A | 1 | Obsolete | |
| S | W | Candy | Candy B | 2 | Approved | |
| S | R | School | School A | 3 | Obsolete | |
| S | S | School | School B | 4 | Pending | |
| S | R | Photo | http://... | 5 | Approved | |
| S | W | Layout | String A | 6 | Pending | |
| S | E | Candy | Inappropriate | 7 | Rejected | |

Fig._5

Key Table

| Owner | Key | Label | Module |
|---|---|---|---|
| S | Candy | Favorite Candy | Profile |
| S | School | School | Profile |
| S | Baseball | Favorite Team | Sports |
| S | Photo | My Photos | Sports |

Fig._6

Permissions Table

| Owner | Action | Setting |
|---|---|---|
| S | Edit | |
| S | View | |
| S | Conversation | |

Fig._7

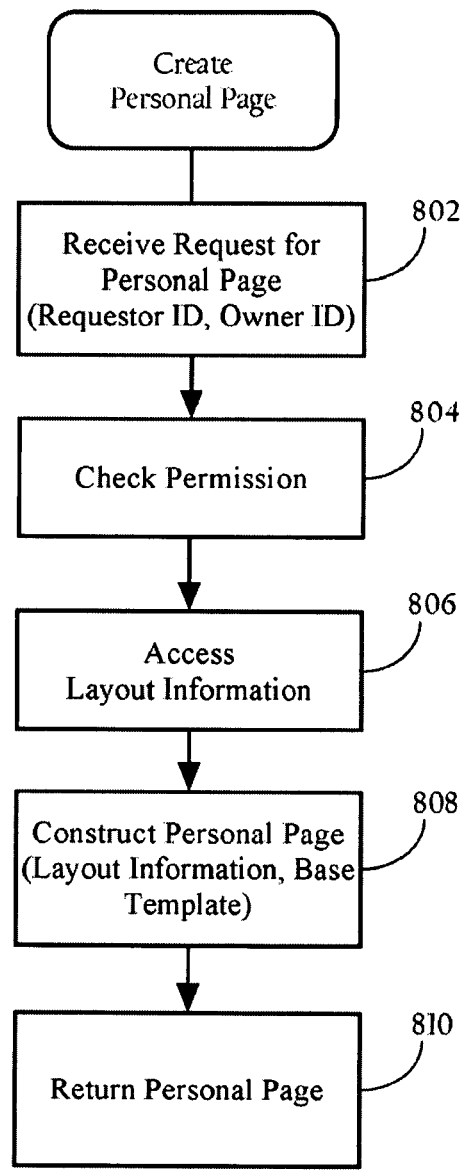
Fig._8

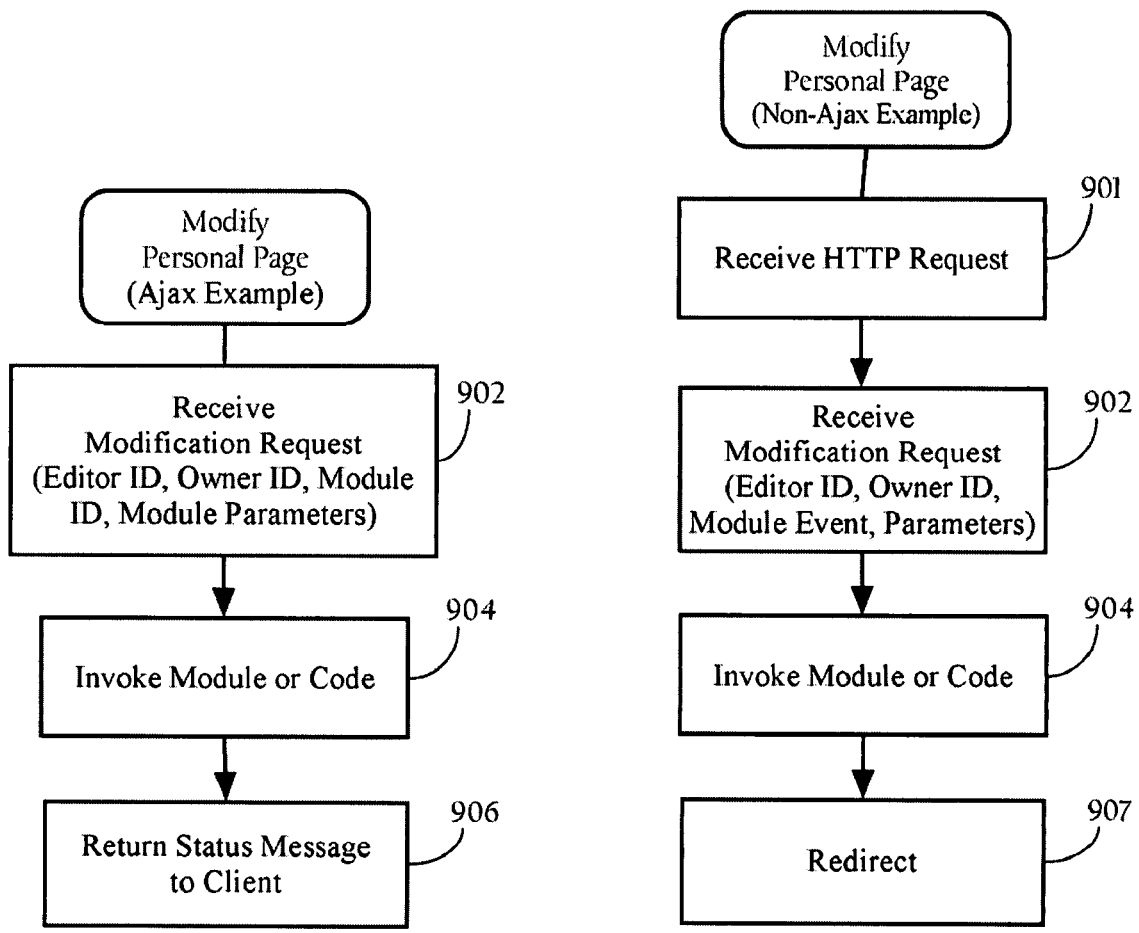
Fig._9A  Fig._9B

← → ⟳ ⊗ 🏠 M http://staging.mosh.mud.yahoo.com/permissions.php  ▼ ▶  Y? · will aldrich  Q Getting Started   Latest Headlines

Y? NewInventions < Profiles < YT... ⊗ | M   Mosh   ⊗ | Y? will aldrich - AT&T Yahoo! Sear... ⊗

Mosh, but don't tell...Please keep details about Mosh within Yahoo!.

MOSH   Your Profile | Pulse | Contacts | Settings | sudo | Help

Search the web [____] Search

Welcome waldrich [Sign Out, My Account]

---

Permissions | Notifications | Email Managment | Simple URL

Permissions

You have control over the way people interact with your Mosh profile. You decide who can see it, who can add or edit content on your page, and who can have conversations..

Who can see your profile?

○ Only you
  ☐ Your friends
  ☐ Your family
● Anyone

Who can edit your profile?

● Only you
  ☑ Your friends
  ☑ Your family
○ Anyone

Who can participate in your conversations?

● Only you
  ☑ Your friends
  ☑ Your family
○ Anyone

[Save] [Reset] [Cancel]

Fig._10

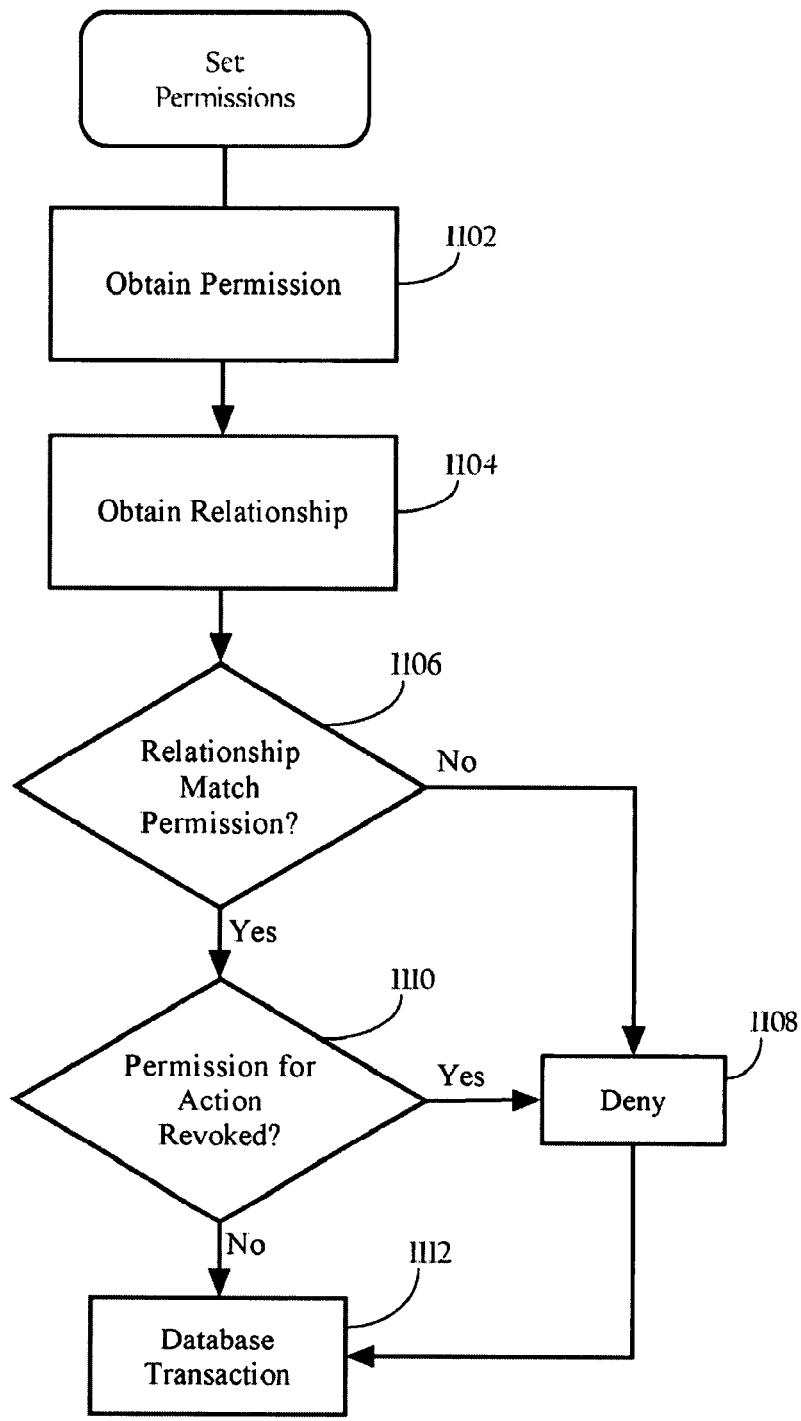
Fig._11

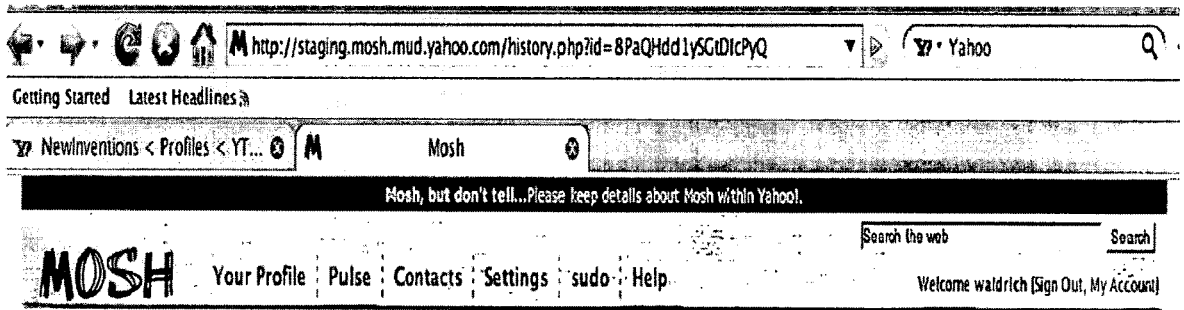
Fig._12

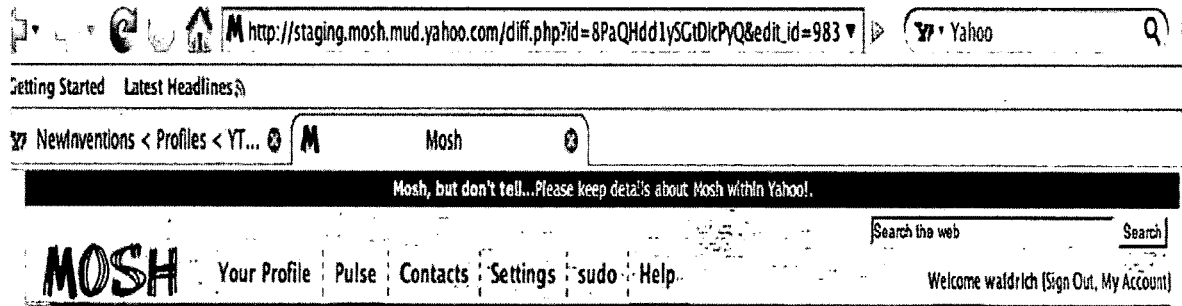
Fig._13

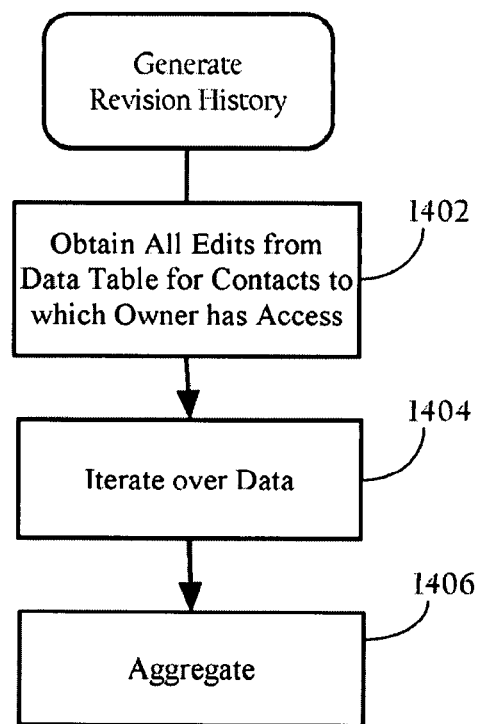
Fig._14

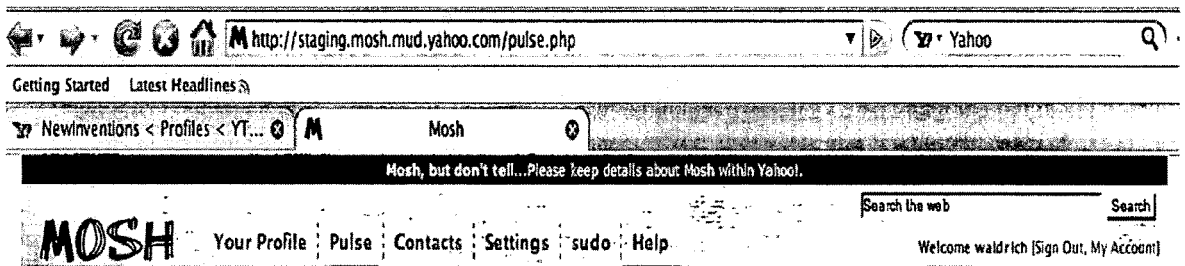
Fig._15

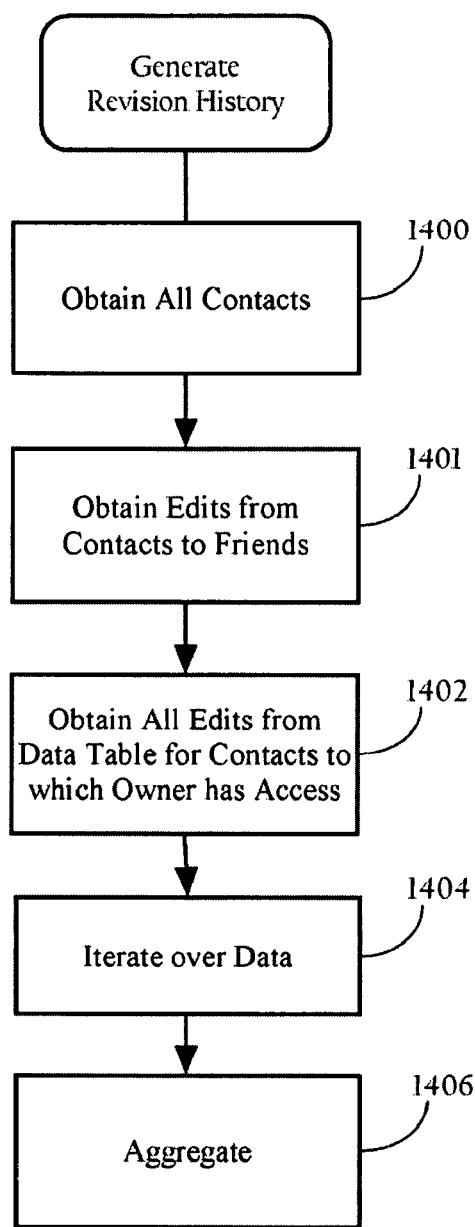
Fig._16

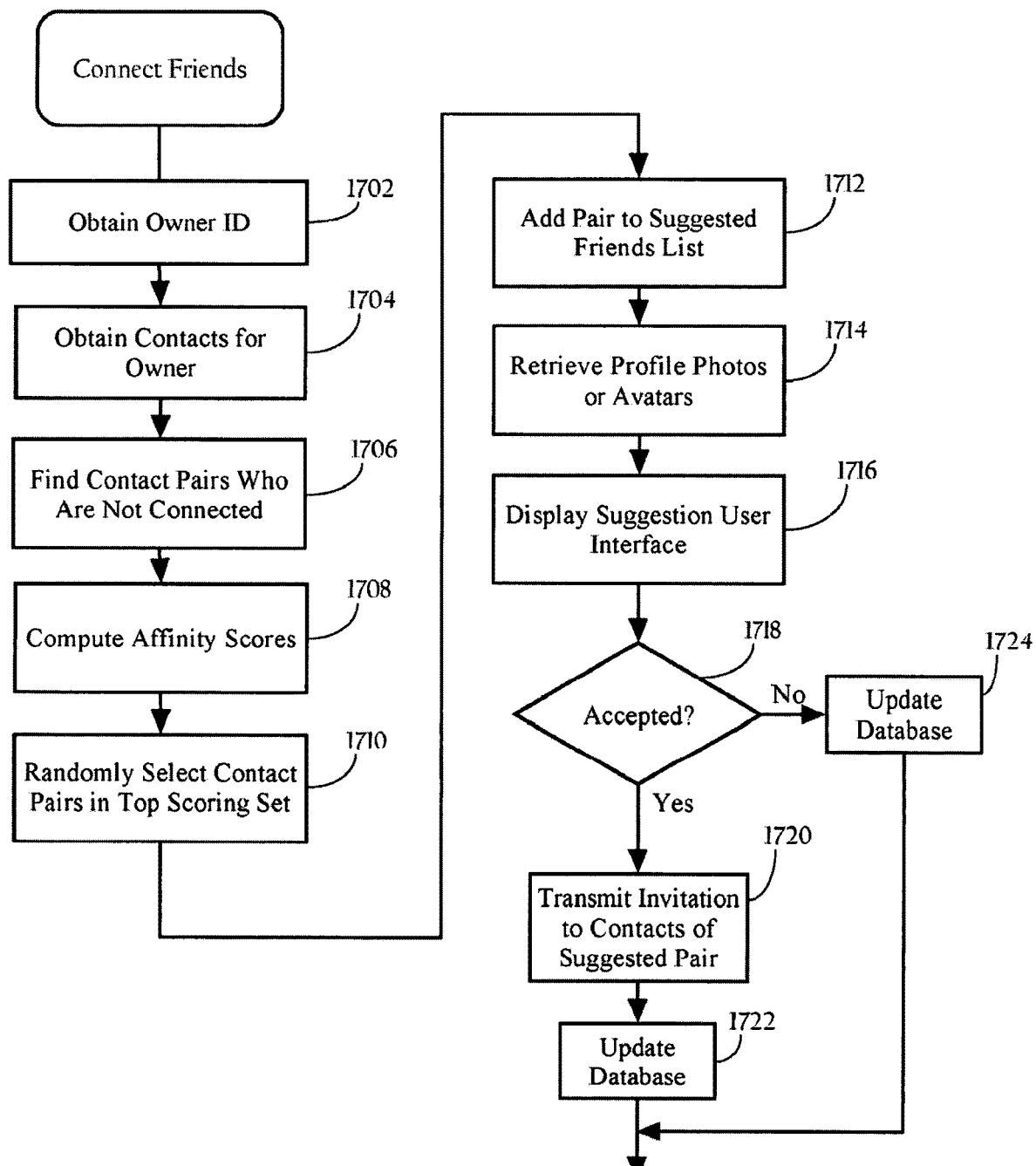
Fig._17

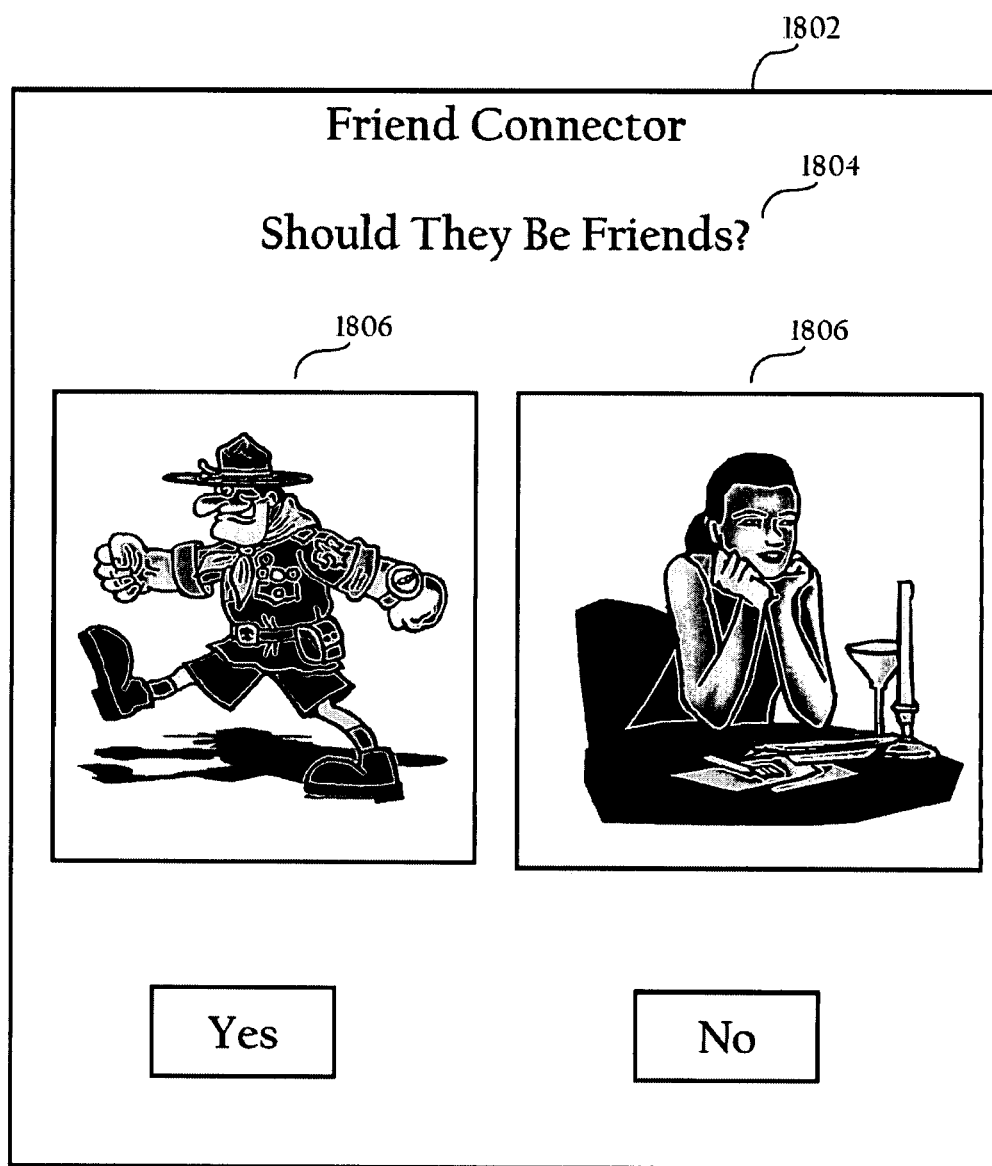
Fig._18

SOCIAL NETWORK SITE INCLUDING MODIFICATION CONTROL AND MANAGEMENT

CROSS-REFERENCE TO RELATED APPLICATIONS

This patent application is a continuation application claiming priority benefit, with regard to all common subject matter, of U.S. patent application Ser. No. 17/229,417, filed Apr. 13, 2021, and entitled "SOCIAL NETWORK SITE INCLUDING MODIFICATION CONTROL AND MANAGEMENT" ("the '417 application"). The '417 application is a continuation application claiming priority benefit, with regard to all common subject matter, of U.S. patent application Ser. No. 13/108,473, filed May 16, 2011, and entitled "SOCIAL NETWORK SITE INCLUDING MODIFICATION CONTROL AND MANAGEMENT," now U.S. Pat. No. 11,120,400, issued Sep. 14, 2021 ("the '400 patent"). The '400 patent is a continuation application claiming priority benefit, with regard to all common subject matter, of U.S. patent application Ser. No. 11/853,768, filed Sep. 11, 2007, and entitled "SOCIAL NETWORK SITE INCLUDING CONTACT-BASED RECOMMENDATION FUNCTIONALITY," now U.S. Pat. No. 7,945,862, issued May 17, 2011. The identified earlier-filed patent application and patents are hereby incorporated by reference in their entirety into the present application.

TECHNICAL FIELD

The present disclosure generally relates to social network sites.

BACKGROUND

Interactive systems connected by wide area networks, such as the Internet, have steadily evolved into vibrant mediums for social interaction. For example, social network sites are fast growing phenomena that provide an interactive medium through which users can grow a network of friends for sharing personal information, as well as for exchanging digital media such as music and videos. Social network sites have become an increasingly influential part of contemporary popular culture around the world. A social network site focuses on the building and verifying of online social networks for communities of people who share interests and activities, or who are interested in exploring the interests and activities of others. Most social network services are primarily web based and provide a collection of various ways for users to interact, such as chat, messaging, email, video, voice chat, file sharing, blogging, discussion groups, and the like.

In general, social networking services, such as MySpace, Facebook and Bebo, allow users to create a profile for themselves. Users can upload a picture of themselves and can often be "friends" with other users. In most social network sites, both users must confirm that they are friends before they are linked. For example, if Alice lists Bob as a friend, then Bob would have to approve Alice's friend request before they are listed as friends. Some social network sites have a "favorites" feature that does not need approval from the other user. Social networks usually have privacy controls that allow the user to choose who can view their profile or contact them. In connection with social network sites, users typically create personalized web pages that display personal information about the users (e.g., name, age, gender, location, etc.). The user may include text, images, photos, and other content to share with other users. The user may periodically add or change content to the personalized web page after it is created.

SUMMARY

The present invention provides a method, apparatus, and systems directed to a social network site with enhanced user interaction functionality. In one implementation, a personal page includes modules, which are functional components associated with the personal page that display various information (such as a contacts or trusted users) in a module region on the personal page. In one implementation, the social network site provides a friend connector module. For a owner of a given personal page and associated contact list, the friend connector module suggests contact pairs from the contact list who have not yet connected to each other. If the owner accepts the suggestion, the friend connector module sends to each contact of the contact pair an invitation to connect to the corresponding contact. In particular implementations, the friend connector module facilitates users in building their networks.

DESCRIPTION OF THE DRAWINGS

FIG. 1 illustrates an example network environment in which particular implementations may operate.

FIG. 2 illustrates an example computing system architecture, which may be used to implement a physical server.

FIG. 3 illustrates example social network site components which may be used to implement particular functionalities described herein.

FIG. 4 illustrates an example personal page.

FIG. 5 illustrates an example data table.

FIG. 6 illustrates an example key table for a given user.

FIG. 7 illustrates an example permission table for a given user.

FIG. 8 illustrates an example process flow associated with creating a personal page.

FIG. 9A illustrates an example process flow associated with modifying a personal page using Asynchronous JavaScript and XML (Ajax).

FIG. 9B illustrates an example process flow associated with modifying a personal page without using Ajax.

FIG. 10 illustrates a user interface including example setting permissions of a user profile.

FIG. 11 illustrates a process flow associated with setting permissions.

FIG. 12 illustrates an example page showing a revision history for a particular user.

FIG. 13 illustrates an example page showing details of changes made by particular users.

FIG. 14 illustrates a process flow associated with displaying a revision history.

FIG. 15 illustrates an example page showing updates from all of the contacts of a given user.

FIG. 16 illustrates a process flow associated with displaying a revision history.

FIG. 17 illustrates a process flow associated with connecting friends by invoking a friend connector module.

FIG. 18 illustrates an example suggestion user interface.

DESCRIPTION OF EXAMPLE EMBODIMENTS

A. Example Network System Architecture

A.1. Example Network Environment

FIG. 1 illustrates an example network environment in which particular implementations may operate. Particular implementations of the invention operate in a wide area network environment, such as the Internet. As FIG. 1 illustrates, a particular implementations of the invention may operate in a network environment comprising a social network site 20 that is operatively coupled to a network cloud 60. Network cloud 60 generally represents one or more interconnected networks, over which the systems and hosts described herein can communicate. Network cloud 60 may include packet-based wide area networks (such as the Internet), private networks, wireless networks, satellite networks, cellular networks, paging networks, and the like. Client nodes 82 and 84 are operably connected to the network environment via a network service provider or any other suitable means. Client nodes 82 and 84 may include personal computers or cell phones, as well as other types of mobile devices such as lap top computers, personal digital assistants (PDAs), etc.

Social network site 20 is a network addressable system that hosts a social network application accessible to one or more users over a computer network. The social network application may include web site and server functionality where users may request and receive identified web pages and other content over the computer network. The social network application may also allow users to configure and maintain personal web pages.

In particular implementations, social network site 20 comprises one or more physical servers 22 and one or more data stores 24. The one or more physical servers 22 are operably connected to computer network 60 via a router 26. The one or more physical servers 22 host functionality that allows users to interact with the social network, such as uploading and retrieving content from client nodes 82 and 84. In one implementation, the functionality hosted by the one or more physical servers may include web or HTTP servers, FTP servers, and the like.

Physical servers 22 also host functionality directed to a social network site 20 described herein. In one implementation, a data store 24 may store user account information, including core information such as user identifiers, passwords, names, etc., as well as other user related information such as user profile data, addresses, preferences, financial account information, pointers to uploaded content and pointers to one or more modules for processing content, etc. A given data store 24 may also store content such as digital content data objects and other media assets. A content data object or a content object, in particular implementations, is an individual item of digital information typically stored or embodied in a data file or record. Content objects may take many forms, including: text (e.g., ASCII, SGML, HTML), images (e.g., jpeg, tif and gif), graphics (vector-based or bitmap), audio, video (e.g., mpeg), or other multimedia, and combinations thereof. Content object data may also include executable code objects (e.g., games executable within a browser window or frame), podcasts, etc. Structurally, content data store 24 connotes a large class of data storage and management systems. In particular implementations, content data store 24 may be implemented by any suitable physical system including components, such as database servers, mass storage media, media library systems, and the like.

A.2. Example Server System Architecture

The server host systems described herein may be implemented in a wide array of computing systems and architectures. The following describes example computing architectures for didactic, rather than limiting, purposes.

FIG. 2 illustrates an example computing system architecture, which may be used to implement a physical server. In one embodiment, hardware system 200 comprises a processor 202, a cache memory 204, and one or more software applications and drivers directed to the functions described herein. Additionally, hardware system 200 includes a high performance input/output (I/O) bus 206 and a standard I/O bus 208. A host bridge 210 couples processor 202 to high performance I/O bus 206, whereas I/O bus bridge 212 couples the two buses 206 and 208 to each other. A system memory 214 and a network/communication interface 216 couple to bus 206. Hardware system 200 may further include video memory (not shown) and a display device coupled to the video memory. Mass storage 218, and I/O ports 220 couple to bus 208. Hardware system 200 may optionally include a keyboard and pointing device, and a display device (not shown) coupled to bus 208. Collectively, these elements are intended to represent a broad category of computer hardware systems, including but not limited to general purpose computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

The elements of hardware system 200 are described in greater detail below. In particular, network interface 216 provides communication between hardware system 200 and any of a wide range of networks, such as an Ethernet (e.g., IEEE 802.3) network, etc. Mass storage 218 provides permanent storage for the data and programming instructions to perform the above described functions implemented in the location server 22, whereas system memory 214 (e.g., DRAM) provides temporary storage for the data and programming instructions when executed by processor 202. I/O ports 220 are one or more serial and/or parallel communication ports that provide communication between additional peripheral devices, which may be coupled to hardware system 200.

Hardware system 200 may include a variety of system architectures; and various components of hardware system 200 may be rearranged. For example, cache 204 may be on-chip with processor 202. Alternatively, cache 204 and processor 202 may be packed together as a "processor module," with processor 202 being referred to as the "processor core." Furthermore, certain embodiments of the present invention may not require nor include all of the above components. For example, the peripheral devices shown coupled to standard I/O bus 208 may couple to high performance I/O bus 206. In addition, in some embodiments only a single bus may exist, with the components of hardware system 200 being coupled to the single bus. Furthermore, hardware system 200 may include additional components, such as additional processors, storage devices, or memories.

As discussed below, in one implementation, the operations of one or more of the physical servers described herein are implemented as a series of software routines run by hardware system 200. These software routines comprise a plurality or series of instructions to be executed by a processor in a hardware system, such as processor 202. Initially, the series of instructions may be stored on a storage device, such as mass storage 218. However, the series of instructions can be stored on any suitable storage medium, such as a diskette, CD-ROM, ROM, EEPROM, etc. Furthermore, the series of instructions need not be stored locally, and could be received from a remote storage device, such as a server on a network, via network/communication interface 216. The instructions are copied from the storage device, such as mass storage 218, into memory 214 and then accessed and executed by processor 202.

An operating system manages and controls the operation of hardware system 200, including the input and output of data to and from software applications (not shown). The operating system provides an interface between the software applications being executed on the system and the hardware components of the system. According to one embodiment of the present invention, the operating system is the Windows® 95/98/NT/XP/Vista operating system, available from Microsoft Corporation of Redmond, Wash. However, the present invention may be used with other suitable operating systems, such as the Apple Macintosh Operating System, available from Apple Computer Inc. of Cupertino, Calif., UNIX operating systems, LINUX operating systems, and the like. Of course, other implementations are possible. For example, the server functionalities described herein may be implemented by a plurality of server blades communicating over a backplane.

A.3. Example Social Network Site Functionality

FIG. 3 illustrates example functional components of a social network site which may be used to implement particular functionalities described herein. The social network site 20 components include a page creator 302, a module executer 304 operatively coupled to a data store 306, a contact manager 308 operatively coupled to a data store 310, and a Hypertext Transfer Protocol (HTTP) server.

As described in more detail below, page creator 302 generates personal pages for users based on layout information (e.g., user profile information, etc.) and a base template. Layout information is described in more detail below in connection with FIG. 4. The module executer 304 is configured to access modules (e.g., from data store 306) and execute one or more modules in order to obtain module information from local resources such as data store 306, from separate platforms such as contact manager 308, or from one or more remote resource. Contacts manager 308 manages the relationships for the users of the social network site 20, and may perform contact related functions such as accessing friend lists, contact lists, and/or presence information from data store 310 or from other external data sources.

In particular implementations, each module is a functional software program (e.g., code, code objects, application, etc.) that the module executer 304 may invoke to obtain module information. For example, module executer 304 may execute a contacts module that communicates with contact manager 308 to fetch contact information for a given user. Such contact information may include, for example, who is viewing the personal page of the user or who is currently online. As described in more detail below, module executer 304 may execute other modules such as media player modules, revision history modules, blurt modules, video game modules, photo modules, conversation modules, etc.

Although FIG. 3 illustrates the foregoing components as separate systems, the functionality represented by each component may be combined into other systems. Furthermore, the functionality represented by each depicted component may be further separated. Still further, implementations of the invention may operate in network environments that include multiples of one or more of the individual systems and sites disclosed herein. In addition, other implementations may operate in network environments where one or more of the system described herein have been omitted.

B. Managing Access to the Social Network Site

In one implementation, a user may access the social network site 20 and establish a user account. To establish an account, the user provides a set of core information, which, in one implementation, may include profile data such as user identification (ID), a password, name, gender, age, a location, etc. In particular implementations, the name may include a first name, a last name, alias name, etc. As described in more detail below, once an account is established, some of the core information (e.g., name, gender, age, location, etc.) may be displayed to the public on the personal page of the user. In particular implementations, the core information may be stored in a data store 24 or in any other suitable user account database(s). After an initial authentication, the user may be granted subsequent accesses automatically using cookie-based mechanisms. For example, after a user has been authenticated, social network site 20 may create or update an encrypted cookie and provide it to the client application, such as a browser, that the user is using to access the social network site 20. The cookie is automatically appended to subsequent requests, which the social network site can decrypt and authenticate to validate subsequent accesses.

In one implementation, the social network site 20 may authenticate a given user by requiring the user to provide user-unique information such as a user ID and password, which maps to the user account. In particular implementations, the user ID may be authenticated using various types of authentication mechanisms (e.g., Yahoo ID and password, Open ID, Microsoft Passport, etc.). The social network ID may be any data string such as an email address (e.g., a Yahoo! email address), an existing or new user ID (e.g., Yahoo ID (YID)), open ID (e.g., a Uniform Resource Locator (URL)), etc.

In one implementation, the social network site 20 may utilize one level of identity (e.g., user ID and password) for purposes of authentication. In particular implementations, the social network site 20 may allow other users to create stub-accounts for new users and invite them to join. In one implementation, a stub-account may be a temporary account that a new user may convert into a regular user account if the new user accepts the invitation to join. For example, in one implementation, the social network site 20 may set up stub-accounts for new users, where a given user may be identified by an email address until the user logs in and claims the stub-account. In one implementation, the original social network ID (e.g., email address) may be subsequently replaced with a newly created social network ID (e.g., a Mosh ID (MUID)). As such, the user may access the social network using the new social network ID. In particular implementations, each previous social network ID of the user may become an alias ID for the current social network ID. In other words, the profile data of the user may be associated with an email or any other suitable data string. As such, the owner of the personal page as well as trusted users may still access the personal page of the owner using the alias ID. Also, other users may locate the owner or send the owner messages or invitations using the alias ID (e.g., email address).

C. Example Personal Page

As introduced above, social network site 20 provides personal pages for users and applies wild-based technology to enable other users to modify the personal page of a given user. As described above, wild functionality, generally, enables a given webpage to be collaboratively modified and edited by multiple users. In particular implementations, the only users other than the owner of the personal page that may modify the personal page of the owner are trusted users. In a particular implementation, the owner of the personal page approves the trusted users. In another implementation, the owner of the personal page may define one or more rules that automatically define a trusted user.

C.1. Elements of the Personal Page

FIG. 4 illustrates the components of an example personal page. As FIG. 4 illustrates, a personal page 400 includes a core information region 402 and one or more module regions 404, 406, 408, and 410. As indicated above, the core information region 402 displays core information, which, in one implementation, may include profile data such as user identification (ID), a password, name, gender, age, a location, etc. In one implementation, the displayed module regions 404-410 can be generated by module executor 304. For example, module executor 304 may be passed a command identifying a user ID, and a module identifier (such as a core information module). The module executor 304 may then invoke module code or retrieve a script and construct the information to be displayed as a set of HTML code. The generated HTML code may then be returned to page creator 302 for incorporation in the HTML page returned to the requesting user.

Each module region 404-410 may display information unique and/or specific to the module type. For example, one module region 404 may display a blurt, which is a statement (e.g., word or phrase of the day) that the owner may write. In particular implementations, trusted users may edit the owner's blurt, and the owner may approve or reject the edit. In one implementation, the blurt module may display a blurt trail showing the different blurts associated with a given owner. In one implementation, the blurt module may display a blurt aggregation page showing the blurts of all contacts.

Another module region 405 may display a Friend Connector module region showings suggestion user interface. For an owner of a given personal page and associated contact list, the friend connector module suggests contact pairs from the contact list who have not yet connected to each other. As described in more detail below in connection with FIGS. 17 and 18, if the owner accepts the suggestion, the friend connector module sends to each contact of the contact pair an invitation to connect to the corresponding contact. In particular implementations, the friend connector module facilitates interaction among users, and extending social networks among users.

Another module region 406 may display a media player for playing a selected media file or media file play list including music, videos, etc. Another module region 408 may display a revision history log. Another module region 410 many display a slideshow of digital photographs uploaded by the page owner. As described in more detail below, the module regions 404-410 display information based on modules. In particular implementations, a module may be code sections, code objects, applications, scripts, etc. that include computer-readable instructions operable to cause a processor to perform a set of actions. Using a player module as an example, the player module may cause a processor to fetch and play music from a local or internal source. The player module may provide user controls on a player displayed in the player module region (e.g., module region 404).

C.2. Generating and Modifying a Personal Page

As described in more detail below, the owner and trusted users may modify the personal page of the owner by adding or removing modules, moving module locations, and/or by modifying information in regions of existing modules. The social network site 20 performs the changes by updating one or more data structures, such as table entries that describe various attributes of the module information associated with the owner of the personal page. For example, in particular implementations, the social network site 20 may utilize a data table that stores user associated data (e.g., user profile data), a key table for looking up information in the data table based on keys, and a permission table for storing permissions.

C.2.a. Data Table

FIG. 5 illustrates an example data table. As FIG. 5 shows, the data table includes multiple table entries, each including information directed to one or more attributes of a personal page or a module associated with a personal page. In one implementation, the first column shows owner fields. For ease of illustration, the data table shown in FIG. 5 shows a single owner. As such, the data in the same row of the indicated owner is associated with the personal page of that owner. The data table may include other entries associated with the owners of other personal pages. Alternatively, in particular implementations, a unique data table may be partitioned from each owner.

In one implementation, the data table may include editor fields, which show which user has modified or attempted to modify the personal page of the owner (i.e., the other fields of that row). As FIG. 5 shows the editor may be the owner or other users. As described above, in one implementation, the only users, other than the owner who may modify the personal page of the owner, are trusted users that have been approved or otherwise configured by the owner (e.g., friends, family, etc.).

As FIG. 5 shows, the data table also includes key fields that store keys, which are strings corresponding to some information item. The value fields store values of information associated with particular keys. The time stamp fields indicate the time a given entry was added. The status fields indicate whether or not the owner has approved or rejected a given change, or whether the entry is obsolete. The difference fields store other information such as metadata or edits that may be associated with a given module. A given data field may also be null or empty for some module fields, depending on the specific module to which the entry corresponds.

In particular implementations, modifications made by users to a given personal page may result in one or more entries in the data table and/or key table. For example, referring to the first or top row, an owner "S" is the user who owns the personal page being changed, and editor "R" is the user making the changes to that personal page. The key that was changed (or added) is "Candy", and the value of "Candy A" associated with that key at time "1." As a subsequent time, referring to the second row from the top, editor "W" changed the value associated with the same key "Candy" to "Candy B" at time "2." As shown in the status field, owner "S" has approved the change. As such, the status field indicates "Approved." In one implementation, once the owner has approved a given change, any previous entries become obsolete, as indicated in the status field of the first row. In one implementation, before a given change is approved or rejected, the status field indicates "Pending."

If the owner rejects a give change, the status field will indicate "Rejected." In one implementation, if a given change is rejected, the associated module region will show the previously approved value or no value if none has been approved. In one implementation, if a given entered value is deemed inappropriate either by the user or by policy, the change will not be initiated and the status field will indicate "Rejected."

FIG. 5 shows other example keys such as a school key, photo key, and layout key. As described in more detail below, the data table may be utilized to add or remove modules from a personal page. This is achieved by adding a new entry to the data table. In one implementation, the value field associated with the key "Layout" stores data indicating which specific modules are to be displayed on a personal page, where the module regions are to be positioned in the personal page, and where other associated information is to be positioned within the module region.

C.2.b. Key Table

FIG. 6 illustrates an example key table for a given user. As FIG. 6 shows, the data table includes owner fields, key fields, label fields, and module fields. In one implementation, the label fields indicate the label that will be displayed (e.g., "Candy"), and the module fields indicate the module IDs of the modules associated with the key. In particular implementations, the fields of the key table are customizable fields. As such, key tables for different users have different fields, depending on the modules associated with the keys.

C.2.c. Permission Table

FIG. 7 illustrates an example permission table for a given user. As FIG. 7 shows, the data table includes owner fields, action fields, and setting fields. In one implementation, a given owner field may identify the ID of the user whose profile the settings are for. In one implementation, a given action field may specify the type of operations users can perform on the page and may specify one or more potential target actions (e.g., "edit module A," "view module B," etc.). In one implementation, a given setting field may contain a value that represents a class of users who can perform the action(s). In particular implementations, values for settings may include "friends," "only me," "anyone," or categories of friends such as "friends" or "family."

The following process flows describe various implementations involving the data table, key table, and permission table, and describe how the social network site utilizes information in these tables to enable users (e.g., a given owner and trusted users) to create and modify a personal page. In one implementation, the owner of a page can add someone as a friend, which confers editing permission on that person for the owner's personal page under the default settings of one implementation of the system. The friend can then return and edit the owner's personal page. After the friend has edited the owner's personal page, the owner can reject or approve the change. If approved, the change stays present. If rejected, the change is removed from the owner's profile. The primary affordance for approving or rejecting changes is a revision history page for the owner's profile, which is described in more detail below in Section D (Revision History Module). In a given implementation, permission can be toggled on or off for any given friend. In particular implementations, only friends can have permission to edit any owner's page. That is, anonymous, non-friend users cannot edit an owner's page.

C.3. Creating a Personal Page

FIG. 8 illustrates an example process flow associated with constructing a personal page in response to a user request. As FIG. 8 shows, the page creator 302 receives a request for a personal page (802). In one implementation, the request may include an owner ID corresponding to the owner of the personal page, and a requestor ID. In one implementation, the requestor ID may be the social network ID of the user requesting the personal page. In one implementation, the requestor may be the owner of the personal page. In particular implementations, the requestor may be a user who is creating the personal page for another user. The page creator 302 then checks the permission associated with the request (804). In one implementation, if the requesting user does not have viewing permissions, a generic layout may be used in step 808 below.

The page creator 302 then accesses layout information (806). The layout information is an encoded string that encodes layout information associated with the personal page. The layout information may include one or more module identifiers and region identifiers encoded using JavaScript Object Notation. In one implementation, the layout information is defined relative to a base template. For example, the base template may include several pre-defined regions, such as quadrants and upper and lower regions. The layout information may define which modules are to be displayed in which base template region.

To access layout information, page creator 302 searches the key table for the layout entries corresponding to the owner of the personal page. As discussed above, as modifications are made, additional table entries are added. In one implementation, the page creator 302 identified all matching table entries including the layout key and finds the latest entry that has not been rejected by the personal page owner. In a particular implementation, as page creator 302 and module executor 304 retrieve data from the data table it stores the entries in a cache to facilitate fast access for subsequent requests. For example, for a given owner, the page creator 302 can obtain all of the associated keys, labels, and modules from the key table. Based on the keys, the page creator 302 can obtain all of the values and other pertinent information from the data table. The page creator 302 then performs calculations such as sorting the data entries by key, identifying latest versions, etc. The page creator 302 then segregates data entries by module, referring to key table, and then caches the module relations, values, etc.

The page creator 302 then constructs the personal page based on the layout information and a base template (808). To perform this step, in one implementation, the page creator 302 causes the module executer 304 to execute one or more modules identified in the encoded layout information associated with each module. In particular implementations, execution of different types of modules results in the generation of HTML, scripts, and/or other code sections for inclusion in the page returned to the requesting user. For example, one module may return user contacts information. Another module may fetch conversation threads. Another module may fetch player information, etc. In particular implementations, the information may be retrieved from local sources (e.g., from local databases 306, 310, etc.) or from external sources (e.g., a web service). A contacts module may fetch user profile data such as contacts, etc., via the contact manager. After the modules generate resulting code sections, they pass the code sections to the page creator 302. After the page creator 302 receives the information, the page creator 302 merges the code section information with a base template. The page creator 302 then returns the personal page to the client of the owner via HTTP server 312 (810).

C.4. Modifying a Personal Page

FIG. 9A illustrates an example process flow associated with modifying a personal page using Asynchronous JavaScript and XML (Ajax) technology. Ajax is a web development technique used for creating interactive web applications. Ajax enables web pages to feel more responsive to users by exchanging small amounts of data with a server that performs database transactions behind the scenes. As such, the entire web page need not be reloaded or re-rendered each time the user requests a change. Overall, this increases the interactivity, speed, functionality, and usability of a web page.

In particular implementations, modules and personal page functionality have client-side scripts, such as Ajax scripts, that allow the modules to be modified on the client side. Ajax enables a user to quickly modify content in a given module region. When a user changes one or more attributes of the personal page, an Ajax script transmits data characterizing the change to social network site 20. When a given change is finalized, Ajax receives a status and implements code to carry out the change, which may include adding HyperText Markup Language (HTML) code to the module region and rerendering the relevant portions of the module region. In addition, the modification also results in a new data table and/or key table entry.

As FIG. 9A shows, the HTTP server 312 receives a modification request (902) resulting from execution of an Ajax script embedded in the personal page. In one implementation, the modification request includes an editor ID, owner ID, module ID, module specific parameters characterizing the modification, etc. The page creator 302, responsive to the request, causes the module executer 304 to invoke the appropriate module or code (904). In one implementation, if the requestor is not the owner of the personal page, the module executer 304 performs a permission check, referring to the permission table. For example, the module executer 304 may determine whether the requestor is a trusted user. In particular implementations, different modules require different permission checks. Permission checks are described in more detail below in connection with FIG. 11. If the requestor has the permission to make the change, the module executer 304 performs the requested change (e.g., add or remove a module, edit information in an existing module region, etc.). In a particular implementation, the module executer 304 also adds a new data table and/or key table entry for the modification. As discussed above, each entry includes the owner of the page, the editor, a key, a value, a time stamp, and optionally other information. The page creator 302 returns a status message to the client (906). On the client side, Ajax code carries out the modification in the appropriate module region of the personal page in response to receiving the status code. In one implementation, the page creator 302 sends an HTML code snippet to the client, and the Ajax code appends the HTML code to an existing element on the personal page, or replaces the HTML code of the existing element.

FIG. 9B illustrates an example process flow associated with modifying a personal page without using Ajax. The HTTP server 312 receives an HTTP request requesting the modification (901) Steps 902 and 904 of FIG. 9B are similar to steps 902 and 904 of FIG. 9A, where the HTTP server then receives a modification request (902), and the module executer 304 invokes the appropriate module or code (904). The HTTP server then redirects the browser back to the personal page, which is re-rendered with the new information (907).

C.5. Setting Permissions

In one implementation, the owner of a given personal page may determine what aspects of the personal page may be viewed or edited, and by whom. In one implementation, only the owner may modify core profile information. FIG. 10 illustrates a user interface including example setting permissions of a user profile. As FIG. 10 shows, the owner can select who can view or edit the profile, or who can participate in conversations (e.g., friends, family, anyone, etc.). FIG. 10 is merely an example and does not limit what permissions the owner may set.

FIG. 11 illustrates a process flow associated with determining permission to modify a page. The module executer 304 obtains permission information associated with the owner (e.g., a permission setting for the action) (1102). The module executer 304 then obtains the relationship of the owner and editor (1104). In one implementation, the module executer 304 may obtain the relations from the contact manager 308. The module executer 304 determines if the relationship matches the permission (1106). For example, the relationship matches the permission if the editor is the owner, or, if the owner has granted permission to the editor. If there is not a match, the module executer 304 denies the request (1108).

If there is not a match, the module executer 304 determines if the permission for the action has been revoked. In particular implementations, the owner may blacklist other individual users. For example, Alice has friends Bob and Eve. Alice has set her profile's edit permissions to "friends." Now Bob and Eve can modify Alice's profile, but it turns out Eve likes to put malicious content on Alice's page. Alice can revoke edit permissions from Eve. Alice then adds Charlie as a friend. Charlie and Bob can modify Alice's profile (because they are "friends") but Eve cannot (because she was blacklisted). In one implementation, Eve's permission setting may be stored in the contacts manager. If the permission for the action has been revoked, the module executer 304 denies the request (1108). Otherwise, if the permission for the action has not been revoked, the module executer 304 performs the appropriate database transaction (1112).

D. Revision History Module

In one implementation, the social network site 20 provides users with a revision history module that tracks the activity of users that view or edit the personal page of a given owner. FIG. 12 illustrates an example page showing a revision history page showing a revision history for a particular personal page. As FIG. 12 shows, the page shows a series of edits to the user's personal page in reverse chronological order from top to bottom. Each line item indicates which module has been added or removed or what aspects of an existing module region have been changed. Each line item also indicates if the owner has approved or rejected a given change, or provides a selection for the owner. For example, referring to line items 5-8 and 10 from the top, the owner has approved those changes. Referring to the second line item from the bottom of the page, another user has written a guestbook entry. The far right shows a "[Reject] [Approve]" selection, which the owner may select. In one implementation, the page may also provide links to show details of the modifications. FIG. 13 illustrates an example page showing details of changes made by particular users. For example, the first set of edits were made by another user, and the second set of edits were made by the owner.

In one implementation, the "Approve" option may be omitted, where edits are implicitly approved and rejecting edits removes the edit. In particular implementations, the revision history module may provide a "Reject as Spam" action to differentiate abusive or malicious edits from simply unwanted edits.

FIG. 14 illustrates a process flow associated with displaying a revision history. As FIG. 14 shows, the module executer 304 executes a revisions history module to obtain all edits from the data table for contacts to which the owner has access (1402). In one implementation, the revision history module performs a permission check during this step. In one implementation, the revision history module may shows only content for contacts profiles to which the user has access (e.g., visibility permissions). The revisions history module then iterates over the data (1404). Specifically, in one implementation, the module executer 304 identifies the relevant keys in all entries associated with the owner and invokes a key value renderer to return a description of the edits. In one implementation, some edits such as rejected edits may be filtered out. The revisions history module then aggregates the data (1406). In one implementation, the module executer 304 sorts the data by time stamp during the aggregation. The module executer 304 then displays the data in reverse chronological order.

In one implementation, the revisions history module determines the last editor for a particular module of a profile. In one implementation, the revisions history module may determine the last editor of the entire personal page. In one implementation, the module executer 304 may determine the most prolific editor.

In one implementation, the revision history module may perform a pulse function, where the revision history module performs a revision history on a global basis (e.g., the edits of all of a given owner's contacts). FIG. 15 illustrates an example page showing updates from all of the contacts of a given user. As FIG. 15 shows, for all contacts, edits are made to the personal pages of other users.

FIG. 16 illustrates a process flow associated with displaying a revision history. As FIG. 16 shows, the revision history module obtains all contacts of a given user (1400) and then obtains all of the edits made by the contacts to other users (1401). The revision history module then obtains all edits from the data table for contacts to which the owner has access (1402). In one implementation, the revision history module performs a permission check during this step. In one implementation, the revision history module may shows only content for contacts profiles to which the user has access (e.g., visibility permissions). The revision history module then iterates over the data (1404). In one implementation, the module executer 304 identifies the relevant keys in all entries associated with the owner and invokes a key value renderer to return a description of the edits. In one implementation, some edits such as rejected edits may be filtered out. The revision history module then aggregates the data (1406). In one implementation, the module executer 304 sorts the data by time stamp during the aggregation. The module executer then displays the data in reverse chronological order.

E. Friend Connector Module

In one implementation, the social network site provides a friend connector module. For an owner of a given personal page and associated contact list, the friend connector module suggests contact pairs from the contact list who have not yet connected to each other. If the owner accepts the suggestion, the friend connector module sends to each contact of the contact pair an invitation to connect to the corresponding contact. In particular implementations, the friend connector module facilitates users in building their networks, as described below.

FIG. 17 illustrates a process flow associated with connecting friends by invoking a friend connector module. In particular implementations, the module executer 304 executes the friend connector module based on a friend connector policy. For example, in one implementation, the module executer 304 may execute the friend connector module whenever a given user adds a new contact to the user's contacts list. In one implementation, the module executer 304 may execute the friend connector module when prompted by a given user. In one implementation, the module executer 304 may execute the friend connector module such that it randomly appears from time to time in contacts region. In one implementation, the module executer 304 may execute the friend connector module in response to a user clicking a link in the contacts region.

For a given owner of a personal page, the friend connector module first obtains the owner ID of the owner (1702). The friend connector module then obtains the contacts for owner (1704). In one implementation, the connector module sends the owner ID to the contact manager 308, which returns a list of contacts based on the owner ID. In one implementation, the list of contacts may include contacts designated as friends, family, and global contacts. The friend connector module then identifies all contact pairs who are not connected (1706). In one implementation, the friend connector module may filter out the last N contact pairs that were suggested to the owner and any pairs where action was taken in response to the suggested contact pair (e.g., accept or decline). The friend connector module then computes affinity scores for all unconnected contact pairs (1708). In one implementation, a given affinity score may be based on various attributes of the contacts. For example, an affinity score may be based on age, hobbies, similar contacts, etc.

The friend connector module then randomly selects a contact pair in a top N scoring set (1710). In one implementation, N may be a predefined threshold set by policy. For example, N may be a number (e.g., top 5 scoring set), a percentage (e.g., top 90%), etc. In one implementation, the friend connector module may select more than one contact pair to present to the owner. The friend connector module then adds the selected contact pair to a suggested friends list (1712). The friend connector module then retrieves profile photos or avatars for each contact of the selected contact pair (1714). In one implementation, for each contact of the selected contact pair, the friend connector module may also retrieve other profile information such as a name, age, hobbies, link to the contacts personal page, etc.

The friend connector module then displays a suggestion user interface (1716). FIG. 18 illustrates an example suggestion user interface 1802. In one implementation, the friend connector module also displays a prompt or question 1804 asking the owner if the owner wants to initiate a connection or introduction between the contacts of the contact pair (e.g., "Should They Be Friends?"). In one implementation, the friend connector module displays photos of the contact pair 1806. If the owner accepts the suggested connection (1718), the friend connector module transmits invitations to the contacts of the suggested pair (1720) and updates the data table to indicate that the owner has accepted the connection (1722). If the owner does not accept the suggestion, the friend connector module updates the data table to indicate that the owner has declined the connection (1722).

In one implementation, for each contact in a suggested friend list, the friend connector module sends an invitation to connect with the corresponding contact in the contact pair. In one implementation, for a given contact pair, if both contacts accept their respective invitations to connect, the friend connector module adds the contacts to each other's contacts list.

As described herein, embodiments of the friend connector module facilitates and promotes interaction among users by suggesting contact pairs from the contact list who have not yet connected to each other and enabling the contact pairs to building their networks.

The present invention has been explained with reference to specific embodiments. For example, while embodiments of the present invention have been described as operating in connection with HTML and HTTP, the present invention can be used in connection with any suitable protocol environment. Other embodiments will be evident to those of ordinary skill in the art. It is therefore not intended that the present invention be limited, except as indicated by the appended claims.

What is claimed is:

1. A computerized method of providing revisions of a plurality of page elements by a personal page over a computer network, the computerized method comprising:
    causing display of the personal page by a first client device;
    causing display of the plurality of page elements by the personal page, the plurality of page elements comprising:
        an owner information page element comprising information indicative of an owner of the personal page;
        a contacts page element comprising friend information indicative of a plurality of friends of the owner; and
        a revision history page element comprising a history of revisions to the personal page;
    receiving, from a second client device, a first revision from a first user,
    wherein the first user is a friend of the owner of the personal page;
    causing display of, by the first client device, the first revision by the revision history page element;
    receiving, from a third client device, a second revision from a second user,
    wherein the second user is a user other than a friend of the owner of the personal page,
    wherein the second user is a friend of the first user; and
    causing display of the second revision by the revision history page element by the first client device, the second client device, and the third client device.

2. The computerized method of claim 1, further comprising generating the revision history page element from a stored data table comprising entries from the first user and the second user, wherein the stored data table indicates friend statuses of the first user and the second user.

3. The computerized method of claim 1, further comprising:
    causing display of a set of elements of the personal page to the first user; and
    causing display of a subset of the set of elements to the second user based on viewing permissions set by the owner of the personal page.

4. The computerized method of claim 1, wherein the first revision is an image or a video, and the second revision is associated with the first revision.

5. The computerized method of claim 1, further comprising:
    generating a friend recommendation of the second user from a list of potential friends;
    causing display of a friend recommender page element on the personal page;
    causing display of a user identifier associated with the second user by the friend recommender page element;
    upon receiving an indication of accepting the friend recommendation of the second user, changing a friend status of the second user; and
    causing display of the user identifier associated with the second user by the contacts page element on the personal page.

6. The computerized method of claim 1, further comprising recommending that a third user be friends with the first user, wherein both the third user and the first user are friends with the owner.

7. The computerized method of claim 6, further comprising computing affinity scores for the first user and the third user, wherein the recommending that the first user and the second user be friends is based on the affinity scores.

8. One or more computer-readable media storing computer-executable instructions that, when executed by at least one processor, performs a method of providing revisions of a plurality of page elements by a personal page over a computer network, the method comprising:
    causing display of the personal page by a first client device;
    causing display of the plurality of page elements by the personal page, the plurality of page elements comprising:
        an owner information page element comprising information indicative of an owner of the personal page;
        a contacts page element comprising friend information indicative of a plurality of friends of the owner; and
        a revision history page element comprising a history of revisions to the personal page;
    receiving, from a second client device, a first revision from a first user,
    wherein the first user is a friend of the owner of the personal page;
    causing display of, by the first client device, the first revision by the revision history page element;
    receiving, from a third client device, a second revision from a second user,
    wherein the second user is a user other than a friend of the owner of the personal page,
    wherein the second user is a friend of the first user; and
    causing display of the second revision by the revision history page element by the first client device, the second client device, and the third client device.

9. The media of claim 8, wherein the method further comprises generating the revision history page element from a stored data table comprising entries from the first user and the second user, wherein the stored data table indicates friend statuses of the first user and the second user.

10. The media of claim 8, wherein the method further comprises:
    causing display of a set of elements of the personal page to the first user; and
    causing display of a subset of the set of elements to the second user based on viewing permissions set by the owner of the personal page.

11. The media of claim 8, wherein the first revision is an image or a video, and the second revision is associated with the first revision.

12. The media of claim 8, wherein the method further comprises:
    generating a friend recommendation of the second user from a list of potential friends;
    causing display of a friend recommender page element on the personal page;
    causing display of a user identifier associated with the second user by the friend recommender page element;
    upon receiving an indication of accepting the friend recommendation of the second user, changing a friend status of the second user; and causing display of the user identifier associated with the second user by the contacts page element on the personal page.

13. The media of claim 8, wherein the method further comprises recommending that a third user be friends with the first user, wherein both the third user and the first user are friends with the owner.

14. The media of claim 13, method further comprises computing affinity scores for the first user and the third user, wherein the recommending that the first user and the second user be friends is based on the affinity scores.

15. A system for providing revisions of a plurality of page elements by a personal page over a computer network, the system comprising:
a data store;
at least one processor; and
one or more computer-readable media storing computer-executable instructions that, when executed by the at least one processor, performs a method of providing the plurality of page elements by the personal page, the method comprising:
causing display of the personal page by a first client device;
causing display of the plurality of page elements by the personal page, the plurality of page elements comprising:
an owner information page element comprising information indicative of an owner of the personal page;
a contacts page element comprising friend information indicative of a plurality of friends of the owner; and
a revision history page element comprising a history of revisions to the personal page;
receiving, from a second client device, a first revision from a first user,
wherein the first user is a friend of the owner of the personal page;
causing display of, by the first client device, the first revision by the revision history page element;
receiving, from a third client device, a second revision from a second user,
wherein the second user is a user other than a friend of the owner of the personal page,
wherein the second user is a friend of the first user; and
causing display of the second revision by the revision history page element by the first client device, the second client device, and the third client device.

16. The system of claim 15, wherein the method further comprises generating the revision history page element from a stored data table comprising entries from the first user and the second user, wherein the stored data table indicates friend statuses of the first user and the second user.

17. The system of claim 15, wherein the method further comprises:
causing display of a set of elements of the personal page to the first user; and
causing display of a subset of the set of elements to the second user based on viewing permissions set by the owner of the personal page.

18. The system of claim 15, wherein the first revision is an image or a video, and the second revision is associated with the first revision.

19. The system of claim 15, wherein the method further comprises:
generating a friend recommendation of the second user from a list of potential friends;
causing display of a friend recommender page element on the personal page;
causing display of a user identifier associated with the second user by the friend recommender page element;
upon receiving an indication of accepting the friend recommendation of the second user, changing a friend status of the second user; and
causing display of the user identifier associated with the second user by the contacts page element on the personal page.

20. The system of claim 15, wherein the method further comprises:
computing affinity scores for the first user and a third user; and
recommending that the third user be friends with the first user based on the affinity scores,
wherein both the third user and the first user are friends with the owner.

* * * * *